(12) United States Patent
Smith

(10) Patent No.: US 8,703,658 B2
(45) Date of Patent: *Apr. 22, 2014

(54) DRILLING FLUID AND METHODS

(75) Inventor: Carl Keith Smith, Calgary (CA)

(73) Assignee: Canadian Energy Services L.P., Calgary (CA)

(*) Notice: Subject to any disclaimer, the term of this patent is extended or adjusted under 35 U.S.C. 154(b) by 160 days.

This patent is subject to a terminal disclaimer.

(21) Appl. No.: 13/171,273

(22) Filed: Jun. 28, 2011

(65) Prior Publication Data

US 2011/0306524 A1  Dec. 15, 2011

Related U.S. Application Data

(63) Continuation-in-part of application No. 12/025,164, filed on Feb. 4, 2008, now Pat. No. 7,989,399.

(60) Provisional application No. 60/894,121, filed on Mar. 9, 2007.

(51) Int. Cl.
*C09K 8/035* (2006.01)
*E21B 21/06* (2006.01)

(52) U.S. Cl.
USPC ........... 507/136; 507/127; 507/128; 507/137; 507/138; 507/139; 507/142; 507/143; 175/65

(58) Field of Classification Search
None
See application file for complete search history.

(56) References Cited

U.S. PATENT DOCUMENTS

| | | | |
|---|---|---|---|
| 3,692,125 A | 9/1972 | Ruhle | |
| 3,810,836 A * | 5/1974 | Norton | 507/116 |
| 3,983,078 A | 9/1976 | Collins | |
| 4,468,334 A | 8/1984 | Cox et al. | |
| 4,645,608 A * | 2/1987 | Rayborn | 507/128 |
| 5,476,610 A | 12/1995 | Schmid et al. | |
| 5,591,700 A | 1/1997 | Harris et al. | |
| 5,618,780 A | 4/1997 | Argillier et al. | |
| 5,723,423 A | 3/1998 | Van Slyke | |
| 5,968,370 A | 10/1999 | Trim | |
| 5,990,050 A * | 11/1999 | Patel | 507/136 |
| 6,018,063 A | 1/2000 | Isbell et al. | |
| 7,530,361 B2 | 5/2009 | Killeen et al. | |
| 7,718,581 B2 | 5/2010 | Egli et al. | |
| 7,902,123 B2 * | 3/2011 | Harrison et al. | 507/90 |
| 2004/0204324 A1 | 10/2004 | Baltoiu et al. | |
| 2005/0003967 A1 | 1/2005 | Rea et al. | |
| 2005/0014655 A1 | 1/2005 | Aston et al. | |
| 2005/0037927 A1 | 2/2005 | Horton | |
| 2005/0037941 A1 | 2/2005 | Munoz et al. | |
| 2005/0113264 A1 | 5/2005 | Vollmer | |
| 2005/0199428 A1 | 9/2005 | Dixon | |
| 2006/0003899 A1 | 1/2006 | Levey et al. | |
| 2006/0019834 A1 * | 1/2006 | Melbouci et al. | 507/100 |
| 2008/0194435 A1 | 8/2008 | Huff et al. | |
| 2010/0009879 A1 | 1/2010 | Theyssen et al. | |

FOREIGN PATENT DOCUMENTS

| WO | WO 2004/025080 A2 | 3/2004 |
|---|---|---|
| WO | WO 2004/050790 | 6/2004 |

OTHER PUBLICATIONS

Surface Chemistry in the Petroleum Industry, Chapter 11, Handbook of Applied Surface and Colloid Chemistry, pp. 251-266, 2001.
Drilling Engineering Challenges in Commercial SAGD Well Design in Alberta, R. Knoll and K. C Yeung, Society of Petroleum Engineers, SPE 62862, Jun. 19-23, 2000.
Novel Drilling Fluid Eliminates Tar Problems Associated with Drilling SAGD Wells, M A Freeman, A. Stoian, J. W. Potapinski, L. C. Elias, M-I Swaco and R. Tetreault, Society of Petroleum Engineers, SPE 90986, Sep. 26-29, 2004.
PetroCanada Process Fluids, DMO HT-40N for Onshore Drilling, Updated Jan. 12, 2000.

* cited by examiner

*Primary Examiner* — John J Figueroa
(74) *Attorney, Agent, or Firm* — Bennett Jones LLP

(57) ABSTRACT

A drilling fluid comprising: a non-ionic surfactant including: a branched alcohol ethoxylate and/or a capped alcohol ethoxylate; and a detergent builder.

37 Claims, No Drawings

DRILLING FLUID AND METHODS

FIELD

The invention relates to fluids used for drilling and completing oil wells and in particular those useful for deterring tar/heavy oil accretion on metal surfaces.

BACKGROUND

The process of drilling a hole in the ground for the extraction of a natural resource requires a fluid for removing cuttings from the wellbore, controlling formation pressures and maintaining hole stability. Drilling through oil sand formations causes problematic accretion of tar on drilling apparatus. Bitumen accretion on metal surfaces impairs drilling operations by blinding shale shaker screens, plugging centrifuges and drill bits, torque and drag increase and stuck pipe or casing. Standard drilling practices through oil sand formations, which are generally unconsolidated, can also lead to hole instability problems.

If these formations are drilled horizontally, torque and drag between the formation and the drill string can limit both the rate of drilling and the ultimate length of the horizontal section that can be achieved.

Solvents, surfactants and viscosifiers have been used in drilling fluids for drilling through heavy oil, including bitumen-containing formations. In addition, or alternately, drilling fluids have been chilled to deter accretion and enhance hole stability.

SUMMARY

A drilling fluid and a method for drilling have been invented.

In accordance with one aspect of the present invention, there is provided an aqueous drilling fluid comprising: 0.01 to 0.5% by weight of a branched alcohol ethoxylate and/or a capped alcohol ethoxylate; and 0.01% to 0.5% by weight of a detergent builder.

In accordance with another aspect of the present invention, there is provided a method for drilling a wellbore through a formation, the method comprising: operating a drilling assembly to drill a wellbore and circulating a drilling fluid through the wellbore as it is drilled, the drilling fluid being water-based and including: 0.01 to 0.5% by weight of a branched alcohol ethoxylate and/or a capped alcohol ethoxylate; and a detergent builder.

It is to be understood that other aspects of the present invention will become readily apparent to those skilled in the art from the following detailed description, wherein various embodiments of the invention are shown and described by way of illustration. As will be realized, the invention is useful for other and different embodiments and its several details are capable of modification in various other respects, all without departing from the spirit and scope of the present invention. Accordingly the drawings and detailed description are to be regarded as illustrative in nature and not as restrictive.

DETAILED DESCRIPTION OF VARIOUS EMBODIMENTS

A drilling fluid and a method for drilling a wellbore has been invented for use in formations bearing heavy oil, also called bitumen or tar. The drilling fluid and method are useful to limit and possibly remove tar accretion on metal surfaces, reduce torque and drag and/or to maintain borehole stability, while working with standard viscosifiers and other chemicals used in drilling fluids. The drilling fluid and method may therefore be environmentally responsible and economically viable.

A drilling fluid according to the present invention includes a non-ionic surfactant including at least one of (i) a branched alcohol ethoxylate or (ii) a capped alcohol ethoxylate; and a detergent builder.

In this drilling fluid, it is believed that the non-ionic surfactant acts to limit tar sand accretion to metal surfaces perhaps by adsorbing onto surfaces or interfaces to change the interfacial tensions and/or the electrical potentials. The non-ionic surfactant may be effective in producing stearic barriers for prevention of tar deposition. The adsorption of the surfactant onto the bitumen will have the hydrophilic group oriented toward the metal. Surfactant molecules adsorbed onto the bitumen particles will have the hydrophilic group oriented toward the metal surfaces. Since viscosifiers may be anionic, a non-ionic surfactant avoids a reaction such as precipitation when operating with the viscosifiers. It is desired that the non-ionic surfactants have a water wetting, detergent characteristics, for example, that may have a hydrophilic-lipophilic balance (HLB) number of 11 to 15. Surfactants with an HLB over 15 may dissolve the bitumen and such solubility is generally not desirable as this may lead to hole instability, high washouts and waste volumes. The non-ionic surfactant may also be low foaming. Modifying the structure of the surfactant's molecule to keep the surface activity while producing unstable foam can be realized by replacing the straight-chain lipophilic group with a branched chain or by using two different sized or shaped lipophilic groups. Changes may be made on the hydrophilic part of the molecule by placing the second lipophobic group into the molecule at some distance, for example a few carbon atoms, or by putting two bulky lipophobic groups on the same carbon atom. Some useful non-ionic surfactants include capped or branched alcohol ethoxylate, such as for example ethoxylated alcohols, ethoxylated propoxylated alcohols, etc. "Capped" implies that —OH moieties are capped with a moiety such as a short alkyl group. Some commercially available non-ionic surfactants that may be useful in a drilling fluid may include one or more of:

alkyl polyethylene glycol ethers based on C10-guerbet alcohol and ethylene oxide, for example, available as Lutensol XP 60™, Lutensol XP 69™, Lutensol XP 70™, Lutensol XP 79™, Lutensol XP 80™, Lutensol XP 89™, Lutensol XP 90™, Lutensol XP 99™ produced by BASF The Lutensol(r) XP products are manufactured by reacting the C10-alcohol with ethylene oxide in stoichiometric proportions. The numeric portion of the product name indicates the general degree of ethoxylation;

chlorine capped ethoxylated C10-14-ISO alcohols such as are available under the trademark Antarox BL-330™ produced by Rhodia;

chlorine capped ethoxylated C9-11-ISO, C10 rich alcohols such as are available under the trademark Antarox LF-330 produced by Rhodia;

end-capped guerbet alcohol ethoxylate for example, available as Dehypon G 2084™ produced by Cognis;

branched secondary alcohol ethoxylates for example, available as Tergitol TMN™ Series available from Dow.

The use of a non-ionic surfactant according to those described gives a drilling fluid detergent characteristics.

A drilling fluid according to the present invention further includes a detergent builder. As will be appreciated, a detergent builder enhances the action of a detergent. Generally, it is believed that builders operate as water wetting agents and remove cations such as of calcium ($Ca^{++}$) and magnesium ($Mg^{++}$), whose presence in the system may impair the detergent action. As such, a builder may reduce the amount of surfactant to be used over a system where no builder is used. This may offer numerous benefits including reducing the amount of tar which is dissolved into the drilling fluid, and thereby enhancing the reuse of the drilling fluid.

Inorganic builders of interest include phosphates, silicates, and oxygen releasing compounds such as perborates and borates. Some builders that may be of interest include one or more of:

- phosphates including trisodium phosphate (TSP) and pyrophosphates, for example, tetra-potassium pyrophosphate (TKPP), sodium acid pyrophosphate (STPP), etc. The phosphate type of builders may also have beneficial dispersing properties, considering that significant amounts of reactive clays may be drilled and no additional dispersant may be required;
- borates including for example sodium metaborate, sodium tetraborate pentahydrate. While some builders may have some adverse environmental effect, borates are believed to be environmentally friendly and therefore may be environmentally of interest in a drilling fluid formulation;
- zeolites including sodium aluminum silicates readily replace their sodium ions with Ca2+ or Mg2+ ions. Complex systems of zeolite/polyacrylate may also be used;
- nitrilotriacetic acid (NTA);
- ethylenediaminetetracetic acid (EDTA) and its salts;
- citrates; or
- potassium or sodium silicates and metasilicates. This type of builder may increase the friction coefficient in the system.

The use of a builder in the drilling fluid enhances performance of the surfactant such that generally less surfactant needs to be used compared to a system without a builder and the drilling fluid may be reused.

Where foam control is of interest, pyrophosphates have been found to be particularly useful. If the drilling fluid exhibits adverse foaming properties, pyrophosphate builder such as tetra-potassium pyrophosphate (TKPP) or sodium acid pyrophosphate (STPP) may be added. If drilling with pyrophosphate builder and foaming begins to become an issue, the concentration of the pyrophosphate may have to be topped up. This may occur, for example, when drilling in clays, which tends to deplete pyrophosphates.

In one embodiment, a water-based drilling fluid may be prepared using 0.01-1.5% by weight of a non-ionic surfactant; and 0.01%-1.0% by weight of a detergent builder. In laboratory testing, it was determined that a concentration of at least 0.5% by weight of a non-ionic surfactant was necessary. However, in field tests it was determined that useful activity could be achieved with concentrations as low as 0.01% of the non-ionic surfactant up to 0.5% by weight as well as concentrations of 0.5%-1.5% by weight. As well in laboratory testing, it was determined that a concentration of at least 0.5% by weight of the detergent builder was necessary. However, in field tests it was determined that useful activity could be achieved with concentrations of builder as low as 0.01% and through to but less than 0.5% by weight as well as concentrations of 0.5%-1.0% by weight.

In one example embodiment, a water-based drilling fluid may be prepared including: 0.01 to <0.5% by weight of an alkyl polyethylene glycol ester and/or a chlorine capped ethoxylated C9-11 (C10 rich) alcohol; and 0.01% to <0.5% by weight of a phosphate-type builder, and/or a silicate-type builder.

A drilling fluid according to the present invention may also include, if desired, a lubricant, also termed a secondary surfactant. In field testing, it was determined that lubricant may play a more significant role in anti-accretion and drill rate performance than originally thought. In some drilling operations, the anti-accreting results were observed without lubricant, but often the addition of lubricant was found to improve the anti-accretion results with the surfactant and builder. The lubricant may act to soften the tar and provide a lubricating action to assist drilling and running liners into long horizontal sections of a wellbore. The lubricant may be non-ionic. High flash point vegetable oils, such as those having a flash point greater than 148° C., may be of some use in the present drilling fluids. Useful lubricants may include, for example, plant product oils and derivatives thereof including fatty acid methyl esters for example with an HLB of about 6, such as are commonly available as vegetable oil or derivatives thereof, soybean oil or derivatives such as soya methyl ester for example, commercially available as SoyClear™ products by AG Environmental Products, LLC or canola methyl ester for example, commercially available as Oleocal™ canola methyl ester products by Lambent Technologies Corp., or canola oil or its derivatives. Lubricants may be added to the drilling fluid when the fluid is prepared, directly into the tanks and may alternately or in addition by added by application first to metal surfaces such as shale shakers, etc. at surface to thereby enter the drilling fluid stream.

In one embodiment, a water-based drilling fluid may be prepared using surfactant, builder and 0.01-1.5% by weight secondary surfactant (also termed a lubricant) such as, for example, a methyl ester of soybean oil. In laboratory testing, it was determined that a concentration of at least 0.5% by weight of a secondary surfactant was useful. However, in field tests it was determined that useful activity could be achieved with concentrations as low as 0.01% by weight of the secondary surfactant through to the 0.5% by weight concentrations identified in lab tests. As such, in the field the drilling fluid may be useful with concentrations of 0.01 to <0.5% of a lubricant such as a plant-based oil.

A drilling fluid according to the present invention may also include, if desired, a viscosifier. A drilling fluid need not include a viscosifier if there is sufficient hole cleaning. In small diameter holes, for example, a viscosifier may not be needed. However, viscosifiers provide carrying capacity to a drilling fluid and, so, in some cases may be of interest. Viscosifiers, for example, increase the viscosity of drilling fluid so that it can carry cuttings along with the flow of drilling fluid. Viscosifiers may also act to reduce fluid loss by inhibiting fluid infiltration to the formation. Viscosifiers may prevent deposition or re-deposition of the bitumen on metal surfaces by suspending the tar and tar sand particles in the fluid. Some common viscosifiers useful in embodiments of the present drilling fluid may include, for example, any of: xanthan gum, wellan gum, schleroglucan and/or guar gum.

In one embodiment, a water-based drilling fluid may be prepared using surfactant, builder and 0.1-0.4% by weight viscosifier. In laboratory testing, it was determined that a concentration of at least 0.2% by weight of a viscosifier was useful. However, in field tests it was determined that useful activity could be achieved with concentrations as low as 0.1% by weight of the viscosifier through to the 0.2% by weight concentrations identified in lab tests.

Fluid loss reducers may also be used in a drilling fluid according to the present invention if desired. Some common fluid loss reducers include, for example, starches, PAC (polyanionic cellulose) and/or CMC (carboxy methyl cellulose). Some of these chemicals may also have a viscosifying function. The fluid loss reducers may provide steric stabilization for the non-ionic surfactants.

The drilling fluid may contain various defoamers such as silicone defoamers, fatty alcohol ethoxylate defoamers, stearate defoamers, etc., as desired, alone or in combination. In one embodiment, silicone defoamer is used alone or with aluminum stearate defoamer. In another embodiment, fatty alcohol ethoxylate defoamer is used alone or with aluminum stearate defoamer in an amount effect to control foaming.

Some components of the drilling fluid may operate best if pH is controlled. For example, the fluid may be more basic with, for example, the pH of the fluid maintained at 10 or more. In one embodiment, the fluid is maintained at a pH of 10.5 or more. Caustic or other basic additives may be employed for pH control.

The drilling fluid is useful to inhibit tar accretion on metal surfaces. However, it may also be used where torque and drag issues are of concern, even apart from concerns regarding accretion. In one aspect the drilling fluid can be used in a method for drilling a wellbore into a heavy oil formation such as an oil sand containing formation. In such a method, without the present additive, tar and drill cuttings such as sand can adhere as accretions to the metal surfaces of the drilling assembly, and metal surfaces in the wellbore such as liners and casing. Thus, the present method includes circulating the aqueous-based drilling fluid, as described above, while operating a drilling assembly to drill the wellbore.

In another aspect the drilling fluid may be used to remove existing accretions on metal surfaces as by circulation through a wellbore or washing of the wellbore surface systems.

The drilling fluid may be reused repeatedly by simply removing the solids it contains.

It will be appreciated that a drilling assembly can include, for example, a drill bit and possibly other cutting surfaces, a drill string, and various control and monitoring subs.

It will also be appreciated, that it may not be necessary to use the same drilling mud throughout an entire drilling operation. For example, a drilling mud selected to control accretion may not be required during drilling through the over burden. The method is particularly useful during drilling wherein oil sand drill cuttings are being produced and very useful where there is more frequent contact between metal surfaces or metal surfaces and the wellbore wall such as, for example, during drilling of the build section and the horizontal section of a wellbore.

Where, during drilling using a drilling fluid according to the present invention, accretions are being deposited to an undesirable extent, the composition can be adjusted to, for example, increase surfactant or secondary surfactant, to inhibit further undesirable amounts of accretion and possibly to remove, at least to some degree, those accretions already deposited.

LABORATORY EXAMPLES

In the following laboratory examples, the test additives are referenced by the product names set out in Table 1.

TABLE 1

| Product Name | Chemical Name | % by weight |
| --- | --- | --- |
| Product A | Poly(oxy-1,2-ethanediyl), alpha (phenylmethyl)-omega-(1,1,3,3-tetramethylbutyl) phenoxy- | 85 |
| | Glycols, polyethylene, mono[(1,1,3,3-tetramethylbutyl) phenyl] ether | 15 |
| | Polyethylene glycol | <3 |
| Product B | Oxirane, methyl-, polymer with oxyrane, mono(octylphenyl) ether, branched | >99 |
| | Polyethylene glycol | <1 |
| Product C | Modified polyethoxylated alcohol | 100 |
| Product D | C8-C10 ethoxylated propoxilated | >98 |
| | Polyethylene glycol | <2 |
| Product E | Butanedioic acid, octenyl- | <63 |
| | Anionic surfactant | >35 |
| Product F | Ethoxylated 2,4,7,9-tetramethyl 5 decyn-4,7-diol | 100 |
| Product G | Poly(oxy-1,2-ethanediyl), alpha.(2-propylheptyl)-omega-hydroxy- | 100 |
| Product H | Poly(oxy-1,2-ethanediyl), alpha.(2-propylheptyl)-omega-hydroxy- | 100 |
| Product I | Poly(oxy-1,2-ethanediyl), alpha-(2-propylheptyl)-omega-hydroxy- | 100 |
| Product J | Poly(oxy-1,2-ethanediyl), alpha-(2-propylheptyl)-omega-hydroxy- | 100 |
| Product K | Ethoxylated C9-10 alcohols | >99.5 |
| Product L | Ethoxylated C8-10 alcohols | >99.5 |
| Product M | Chlorine capped ethoxylated C10-14 alcohols | >94 |
| Product N | Chlorine capped ethoxylated C9-11 alcohols, C10 rich | >94 |
| Product O | Triterpene, Sapogenin glycosides, vegetal steroid | 100 |
| Product P | Sodium tetraborate decahydrate | 100 |
| Product Q | Tetrapotassium pyrophosphate | 100 |
| Product R | Sodium Metaborate | 100 |
| Product S | Sodium silicate | 82.5 |
| Product T | Zeolite | 78-82 |
| Product U | Pine oil | 100 |
| Product V | Methyl ester of soybean oil | 100 |
| Product W | Turpentine oil | 100 |
| Product X | Diethyl Phthalate | 100 |
| Product Y | Derived from canola oil | 100 |
| Product Z | Sodium tetraborate pentahydrate | 100 |
| Milligan MBTI P01D | Methyl ester of canola oil | 100 |
| Milligan MBTI P03D | Methyl ester of canola oil | 100 |
| Milligan MBTI P04D | Methyl ester of canola oil | 100 |
| Milligan MBTI P05D | Methyl ester of canola oil | 100 |
| Milligan MBTI P06D | Methyl ester of canola oil | 100 |

Tables 2 to 14 includes results from various tests conducted, wherein the samples are prepared by adding 200 mL of water in a mixing cup followed by the test additives and 40 g of tar sand core material. Each sample is then mixed 15 to 20 seconds on a multimixer prior to placement in 260 mL rolling cell with a corresponding pre-weighed metal bar. The samples are rolled for 30 min. Then the tar accretion is measured by weight gain of the bars and by observation. The tests are run at room temperature.

TABLE 2

| Sample Number | Product | Conc. L/m3 | Foaming | Tar on bar Weight (g) | Tar on Cell | Tar on Lid | Notes |
|---|---|---|---|---|---|---|---|
| 1 | Blank | | | 1.3 | 100% | 100% | |
| 2 | Product A | 5 | ** | 3.0 | 50% | 5% | |
| 3 | Product B | 5 | ** | 2.0 | 40% | 60% | |
| 4 | Product C | 5 | **** | 3.4 | 90% | 95% | Milky in water Thin |
| 5 | Product D | 5 | * | 1.9 | 90% | 100% | |
| 6 | Product E | 5 | * | 3.5 | 95% | 100% | Milky in water Thick |

TABLE 3

| Sample Number | Product | Conc. L/m3 | Foaming | Tar on bar Weight (g) | Tar on Cell | Tar on Lid | Notes |
|---|---|---|---|---|---|---|---|
| 1 | Blank | | | 2.6 | 100% | 80% | |
| 2 | Product B | 10 | ** | 3.1 | trace | Trace | |
| 3 | Product B Product Y | 5 10 | ** | 1.6 | 50% | 35% | |
| 4 | Product B Product Y | 10 10 | **** | 3.8 | 10% | 30% | |
| 5 | Product B Product Y | 5 20 | *** | 2.8 | 80% | 30% | |
| 6 | Product Y | 10 | | 1.8 | 100% | 100% | Oil and tar separates from water |

TABLE 4

| Sample Number | Product | Conc. L/m3 | Foaming | Tar on bar Weight (g) | Tar on Cell | Tar on Lid | Notes |
|---|---|---|---|---|---|---|---|
| 1 | Product A | 10 | ** | 4.5 | 60% | 2% | |
| 2 | Product A | 20 | **** | 5.6 | 1% | 0% | The tar is sticking to the bar |
| 3 | Product A Product V | 5 10 | ** | 0.6 | 90% | 100% | |
| 4 | Product A Product V | 5 20 | * | 1.4 | 90% | 10% | |
| 5 | Product A Product V | 10 20 | ** | 2.0 | 95% | 5% | |
| 6 | Product V | 30 | | 0.3 | Oil with dissolved tar | Oil with dissolved tar | |

TABLE 5

| Sample Number | Product | Conc. L/m3 | Foaming | Tar on bar Weight (g) | Tar on Cell | Tar on Lid | Notes |
|---|---|---|---|---|---|---|---|
| 1 | Product A Product W | 5 10 | ** | 1.5 | 95% | 3% | |
| 2 | Product A Product W | 10 10 | *** | 1.1 | 20% | 25% | |
| 3 | Product A Limonene | 10 20 | *** | 0.5 | 20% | 100% | |
| 4 | Product A Limonene | 5 10 | ** | 1.1 | 20% | 40% | |
| 5 | Product A Limonene | 10 10 | *** | 2.7 | 20% | 25% | |
| 6 | Product A Limonene | 10 20 | *** | 2.6 | 15% | 100% | |

TABLE 6

| Sample Number | Product | Conc. L/m3 | Foaming | Tar on bar Weight (g) | Tar on Cell | Tar on Lid | Notes |
|---|---|---|---|---|---|---|---|
| 1 | Product F | 5 | * | 2.8 | 90% | 40% | |
| 2 | Product G | 5 | ** | 1.9 | 90% | 5% | |
| 3 | Product H | 5 | **** | 1.1 | 90% | 95% | Bottom of cell clean |
| 4 | Product I | 5 | **** | 1.8 | 100% | 60% | |
| 5 | Product J | 30 | ***** | 2.5 | 80% | 40% | |
| 6 | Limonene | 30 | | 0.2 | 0% | 5% | Film |

TABLE 7

| Sample Number | Product | Conc. L/m3 | Foaming | Tar on bar Weight (g) | Tar on Cell | Tar on Lid | Notes |
|---|---|---|---|---|---|---|---|
| 1 | Product A Limonene Product Q | 10 20 5 | — | 0.1 | No | No | Some oily film |
| 2 | Product B Limonene Product Q | 10 20 5 | *** | 0.1 | No | No | Some oily film |
| 3 | Product D Limonene Product Q | 10 20 5 | ** | 0.1 | No | No | Some oily film |
| 4 | Product E Limonene Product Q | 10 20 5 | ** | 0.1 | No | No | Some oily film |
| 5 | Product G Limonene Product Q | 10 20 5 | **** | 0.1 | No | No | Totally clean |
| 6 | Product H Limonene Product Q | 10 20 5 | **** | 0.1 | No | No | Totally clean |

TABLE 8

| Sample Number | Product | Conc. L/m3 | Foaming | Tar on bar Weight (g) | Tar on Cell | Tar on Lid | Notes |
|---|---|---|---|---|---|---|---|
| 1 | Product G Limonene Product Q Defoamer Silicone | 10 15 5 5 | * | — | — | — | |

TABLE 8-continued

| Sample Number | Product | Conc. L/m3 | Foaming | Tar on bar Weight (g) | Tar on Cell | Tar on Lid | Notes |
|---|---|---|---|---|---|---|---|
| 2 | Product H | 10 | * | — | — | — | |
| | Limonene | 15 | | | | | |
| | Product Q | 5 | | | | | |
| | Defoamer Silicone | 5 | | | | | |
| 3 | Product G | 10 | * | — | — | — | |
| | Product X | 15 | | | | | |
| | Product Q | 5 | | | | | |
| | Defoamer Silicone | 5 | | | | | |
| 4 | Product H | 10 | * | — | — | — | |
| | Product X | 15 | | | | | |
| | Product Q | 5 | | | | | |
| | Defoamer Silicone | 5 | | | | | |
| 5 | Product G | 10 | * | — | — | — | Cleanest |
| | Product V | 15 | | | | | |
| | Product Q | 5 | | | | | |
| | Defoamer Silicone | 5 | | | | | |
| 6 | | | | | | | |

TABLE 9

| Sample Number | Product | Conc. L/m3 | Foaming | Tar on bar Weight (g) | Tar on Cell | Tar on Lid | Notes |
|---|---|---|---|---|---|---|---|
| 1 | Xanthan Gum | 5 | * | — | — | — | |
| | Product H | 5 | | | | | |
| | Product V | 10 | | | | | |
| | Product Q | 5 | | | | | |
| | Defoamer Silicone | 10 | | | | | |
| 2 | Xanthan Gum | 5 | * | — | — | — | |
| | Product K | 5 | | | | | |
| | Product V | 10 | | | | | |
| | Product Q | 5 | | | | | |
| | Defoamer Silicone | 5 | | | | | |
| 3 | Xanthan Gum | 5 | * | — | — | — | |
| | Product L | 10 | | | | | |
| | Product V | 5 | | | | | |
| | Product Q | 5 | | | | | |
| | Defoamer Silicone | 5 | | | | | |
| 4 | Xanthan Gum | 5 | * | — | 5% | — | |
| | Product M | 10 | | | | | |
| | Product V | 5 | | | | | |
| | Product Q | — | | | | | |
| | Defoamer Silicone | | | | | | |
| 5 | Xanthan Gum | 5 | * | — | — | — | |
| | Product N | 10 | | | | | |
| | Product V | 5 | | | | | |
| | Product Q | — | | | | | |
| | Defoamer Silicone | | | | | | |
| 6 | Xanthan Gum | 5 | * | 1.4 | trace | — | Has an oily film |
| | Product O | 5 | | | | | |
| | Product V | 10 | | | | | |
| | Product Q | 5 | | | | | |
| | Defoamer Silicone | — | | | | | |

TABLE 10

| Sample Number | Product | Conc. L/m3 | Foaming | Tar on bar Weight (g) | Tar on Cell | Tar on Lid | Notes |
|---|---|---|---|---|---|---|---|
| 1 | Blank | | | 12.8 | 30% | 90% | |
| 2 | Product N | 10 | ** | — | — | — | |
| | Product V | 10 | | | | | |
| | Product Q | 5 | | | | | |
| | Defoamer Silicone | — | | | | | |
| 3 | Product N | 10 | ** | 0.7 | — | — | |
| | Product V | 10 | | | | | |
| | Product P | 5 | | | | | |
| | Defoamer Silicone | — | | | | | |
| 4 | Product N | 10 | ** | 0.5 | 5% | — | |
| | Product V | 10 | | | | | |
| | Product X | 10 | | | | | |
| | Product P | 5 | | | | | |
| | Defoamer Silicone | — | | | | | |
| 5 | Product P | 5 | | 7.4 | 50% | 100% | |
| 6 | Product Q | 5 | | 3.2 | 15% | 80% | |

TABLE 11

| Sample Number | Product | Conc. L/m3 | Foaming | Tar on bar Weight (g) | Tar on Cell | Tar on Lid | Notes |
|---|---|---|---|---|---|---|---|
| 1 | Xanthan Gum | 4 | — | — | — | — | |
| | Product H | 5 | | | | | |
| | Product V | 10 | | | | | |
| | Product Q | 5 | | | | | |
| 2 | Xanthan Gum | 4 | — | — | trace | — | Easy to clean with water |
| | Product H | 5 | | | | | |
| | Product V | 10 | | | | | |
| | Product S | 5 | | | | | |
| 3 | Xanthan Gum | 4 | — | — | 5% | — | Easy to clean with water |
| | Product H | 5 | | | | | |
| | Product V | 10 | | | | | |
| | Product T | 5 | | | | | |
| | | 100 | | | | | |
| 4 | Xanthan Gum | 4 | — | — | — | — | |
| | Product N | 5 | | | | | |
| | Product V | 10 | | | | | |
| | Product Q | 5 | | | | | |
| 5 | Xanthan Gum | 4 | — | — | trace | — | Easy to clean with water |
| | Product N | 5 | | | | | |
| | Product V | 10 | | | | | |
| | Product S | 5 | | | | | |
| 6 | Xanthan Gum | 4 | — | — | 5% | — | Easy to clean with water |
| | Product N | 5 | | | | | |
| | Product V | 10 | | | | | |
| | Product T | 5 | | | | | |
| | | 100 | | | | | |

TABLE 12

| Sample Number | Product | Conc. L/m3 | Foaming | Tar on bar Weight (g) | Tar on Cell | Tar on Lid | Notes |
|---|---|---|---|---|---|---|---|
| 1 | Xanthan Gum | 4.2 | — | — | — | — | — |
|   | Product H | 5 | | | | | |
|   | Milligan MBTI | 10 | | | | | |
|   | P01D | 5 | | | | | |
|   | Product Q | | | | | | |
| 2 | Xanthan Gum | 4.2 | — | — | — | — | — |
|   | Product H | 5 | | | | | |
|   | Milligan MBTI | 10 | | | | | |
|   | P03D | 5 | | | | | |
|   | Product Q | | | | | | |
| 3 | Xanthan Gum | 4.2 | — | — | — | — | — |
|   | Product H | 5 | | | | | |
|   | Milligan MBTI | 10 | | | | | |
|   | P04D | 5 | | | | | |
|   | Product Q | | | | | | |
| 4 | Xanthan Gum | 4.2 | — | — | — | — | — |
|   | Product H | 5 | | | | | |
|   | Milligan MBTI | 10 | | | | | |
|   | P05D | 5 | | | | | |
|   | Product Q | | | | | | |
| 5 | Xanthan Gum | 4.2 | — | — | — | — | — |
|   | Product H | 5 | | | | | |
|   | Milligan MBTI | 10 | | | | | |
|   | P06D | 5 | | | | | |
|   | Product Q | | | | | | |
| 6 | Xanthan Gum | 4.2 | — | — | — | — | — |
|   | Product H | 5 | | | | | |
|   | Product U | 10 | | | | | |
|   | Product Q | 5 | | | | | |

TABLE 13

| Sample Number | Product | Conc. L/m3 | Foaming | Tar on bar Weight (g) | Tar on Cell | Tar on Lid | Notes |
|---|---|---|---|---|---|---|---|
| 1 | Blank | | — | 11.4 | 30% | — | — |
| 2 | Xanthan Gum | 4.0 | — | — | — | — | — |
|   | Product H | 5 | | | | | |
|   | Product V | 10 | | | | | |
|   | Product Q | 5 | | | | | |
|   | Defoamer Silicone | 2 | | | | | |
| 3 | Xanthan Gum | 4.0 | — | — | — | — | — |
|   | Product H | 5 | | | | | |
|   | Product V | 10 | | | | | |
|   | Product R | 5 | | | | | |
|   | Defoamer Silicone | 2 | | | | | |
| 4 | Xanthan Gum | 4.0 | — | — | — | — | — |
|   | Product H | 5 | | | | | |
|   | Product V | 10 | | | | | |
|   | Product Z | 5 | | | | | |
|   | Defoamer Silicone | 2 | | | | | |
| 5 | Xanthan Gum | 4.0 | — | — | — | — | — |
|   | Product H | 5 | | | | | |
|   | Milligan MBTI | 10 | | | | | |
|   | P06D | 5 | | | | | |
|   | Product Q | 2 | | | | | |
|   | Defoamer Silicone | | | | | | |
| 6 | Xanthan Gum | 4.0 | — | — | — | — | — |
|   | Product H | 5 | | | | | |
|   | Product U | 10 | | | | | |
|   | Product Q | 5 | | | | | |
|   | Defoamer Silicone | 2 | | | | | |

TABLE 14

| Sample Number | Product | Conc. L/m3 | Foaming | Tar on bar Weight (g) | Tar on Cell | Tar on Lid | Notes |
|---|---|---|---|---|---|---|---|
| 1 | Blank | | — | 7.6 | 100% | Trace | |
| 2 | Xanthan Gum | 4.0 | — | 2.1 | Trace | Trace | |
|   | Product V | 10 | | | | | |
| 3 | Xanthan Gum | 4.0 | — | 1.6 | Trace | Trace | |
|   | Product V | 10 | | | | | |
|   | Product H | 5 | | | | | |
| 4 | Xanthan Gum | 4.0 | — | 1.8 | Trace | Trace | |
|   | Product V | 30 | | | | | |
| 5 | Xanthan Gum | 4.0 | — | 0.5 | Trace | Clean | |
|   | Product H | 10 | | | | | |
|   | Product Q | 5 | | | | | |
| 6 | Xanthan Gum | 4.0 | — | 2.4 | Trace | Clean | |
|   | Product H | 10 | | | | | |
|   | Product V | 10 | | | | | |

Example 15

Lubricity tests were conducted using a baroid lubricity meter, which provides a reading of the friction co-efficient (CoF). A solution of xanthan gun (4 kg/m3) in water was tested and generated a CoF reading of 0.30. Another aqueous solution was prepared including xanthan gun (4 kg/m3), alkyl polyethylene glycol ether (Lutensol XP 79) (10 L/m3), and soya methyl ester (50 L/m3) and this generated a CoF reading of 0.20. The CoF was reduced from 0.3 to 0.2 with the addition of the two products.

Field Tests:

Example A

Background: In Alberta, Canada; Drilled 156 mm hole into the Ft. McMurray formation. The Ft. McMurray formation is an unconsolidated sandstone containing 30% v/v bitumen. Drilling rate was approximately 200 m/hr.

Drilling Fluid: A fresh water based drilling fluid including: xanthan gum for viscosity, a polyanionic cellulose polymer (Drispac Regular) for fluid loss control, a silicone based defoamer, caustic to control the pH at 10.5, a deflocculant additive (Desco CF), an amine based shale inhibitor and a builder (625 kg of TKPP) was used to drill into the Ft. McMurray formation. The shaker screens were monitored for accretion. When sand started to stick to the shakers, one pail (20 L) of surfactant (Lutensol XP 79) and one pail (20 L) of a soya bean-based lubricant were added to the drilling fluid, equating to concentrations of approximately 0.04% of each of the surfactant and the lubricant in the drilling fluid. After addition of the surfactant and lubricant, accretion no longer occurred on the shaker screens.

As drilling proceeded into a lateral, horizontal section in the formation, concentrations of 1 to 3 L/m3 of the surfactant were required to continue to prevent accretion.

Example B

Background: In Alberta, Canada; Drilled 311 mm hole to Intermediate Casing Depth of 665 mMD and casing set at ~90 degrees inclination in the Ft. McMurray formation. Set and cement 244.5 mm casing.

Drilling Fluid: A fresh water based drilling fluid including: xanthan gum for viscosity, a polyanionic cellulose polymer (Drispac Regular) for fluid loss control, a silicone based defoamer, caustic to control the pH at 10.5, a deflocculant additive (Desco CF), an amine based shale inhibitor and a builder (625 kg of TKPP) was used to drill into the Ft. McMurray formation. Just above the Ft. McMurray bitumen 100 L of anti-accretion surfactant (Lutensol XP 79) and 100 L of soya bean/canola oil-based lubricant were added to approximately 58.4 m3 of circulating volume of drilling fluid. This equates to concentrations of approximately 1.7 L/m3 of both the surfactant and the lubricant in the drilling fluid. This section was successfully drilled, cased and cemented terminating in the Ft. McMurray formation.

Example C

Background: In Alberta, Canada; Drilled 311 mm hole to Intermediate Casing Depth of 682 mMD and casing set at ~90 degrees inclination in the Ft. McMurray formation. Set and cement 244.5 mm casing.

Drilling Fluid: A fresh water based drilling fluid including xanthan gum for viscosity, a polyanionic cellulose polymer (Drispac Regular) for fluid loss control, a silicone based defoamer, caustic to control the pH at 10.5, an amine based shale inhibitor and a builder (675 kg of TKPP) was used to drill into the Ft. McMurray formation. Just above the Ft. McMurray bitumen 20 L of anti-accretion surfactant (Lutensol XP: 79) and 20 L of plant oil-based lubricant (vegetable oil) were added to approximately 92.9 m3 of circulating volume of drilling fluid. This equates to concentrations of approximately 0.22 L/m3 of both the surfactant and the lubricant in the drilling fluid. This section was successfully drilled, cased and cemented terminating in the Ft. McMurray formation.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope as defined in the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

I claim:

1. A method for drilling a wellbore through a formation, the method comprising: operating a drilling assembly to drill a wellbore and circulating a drilling fluid through the wellbore as it is drilled, the drilling fluid being water based and including: 0.01 to 0.5% by weight of a branched alcohol ethoxylate; and a detergent builder.

2. The method of claim 1, wherein the detergent builder is at a concentration of 0.01% to 0.5% by weight.

3. The method of claim 1, wherein the drilling fluid further includes a viscosifer.

4. The method of claim 1 wherein the drilling fluid is reused.

5. The method of claim 1 wherein drill cuttings are removed from the drilling fluid prior to reuse.

6. The method of claim 1 wherein the branched alcohol ethoxylate is an alkyl polyethylene glycol ethers based on C10-Guerbet alcohol and ethylene oxide.

7. The method of claim 1 wherein the detergent builder includes a phosphate-type builder.

8. The method of claim 1 wherein the detergent builder includes a pyrophosphate-type builder.

9. The method of claim 8 wherein the detergent builder is TKPP.

10. The method of claim 1 wherein the detergent builder includes a silicate-type builder.

11. The method of claim 1 wherein the drilling fluid further comprises a defoamer.

12. The method of claim 11 wherein the defoamer includes a fatty alcohol ethoxylate.

13. The method of claim 1, wherein the drilling fluid further comprises a plant-based oil lubricant.

14. The method of claim 13, wherein the plant-based oil lubricant includes one or more of vegetable oil and/or derivatives thereof, canola oil and/or derivatives thereof; and soya bean oil and/or derivatives thereof.

15. The method of claim 13 wherein the lubricant includes a fatty acid methyl ester.

16. The method of claim 1 wherein the branched alcohol ethoxylate is an alkyl polyethylene glycol ether based on C10-Guerbet alcohol and ethylene oxide; the detergent builder is TKPP; and 0.01 to 0.5% by weight of a plant-based oil.

17. The method of claim 16 further comprising a fatty alcohol ethoxylate defoamer.

18. The method of claim 16 further comprising maintaining the pH at greater than 10.

19. A method for drilling a wellbore through a formation, the method comprising: operating a drilling assembly to drill a wellbore and circulating a drilling fluid through the wellbore as it is drilled, the drilling fluid being water-based and including: 0.01 to 0.5% by weight of a capped alcohol ethoxylate; and a detergent builder.

20. The method of claim 19, wherein the detergent builder is at a concentration of 0.01% to 0.5% by weight.

21. The method of claim 19, wherein the drilling fluid further includes a viscosifer.

22. The method of claim 19 wherein the drilling fluid is reused.

23. The method of claim 19 wherein drill cuttings are removed from the drilling fluid prior to reuse.

24. The method of claim 19 wherein the detergent builder includes a phosphate-type builder.

25. The method of claim 19 wherein the detergent builder includes a pyrophosphate-type builder.

26. The method of claim 25 wherein the detergent builder is TKPP.

27. The method of claim 19 wherein the detergent builder includes a silicate-type builder.

28. The method of claim 19 wherein the drilling fluid further comprises a defoamer.

29. The method of claim 28 wherein the defoamer includes a fatty alcohol ethoxylate.

30. The method of claim 19, wherein the drilling fluid further comprises a plant-based oil lubricant.

31. The method of claim 30, wherein the plant-based oil lubricant includes one or more of vegetable oil and/or derivatives thereof, canola oil and/or derivatives thereof; and soya bean oil and/or derivatives thereof.

32. The method of claim 30 wherein the lubricant includes a fatty acid methyl ester.

33. The method of claim 19 wherein the capped alcohol ethoxylate includes chlorine capped ethoxylated C10-14-ISO alcohols.

34. The method of claim 19 wherein the capped alcohol ethoxylate includes chlorine capped ethoxylated C9-11 ISO, C10 rich alcohols.

35. The method of claim 19 wherein the capped alcohol ethoxylate is chlorine capped ethoxylated C9-11 ISO, C10 rich alcohols; the detergent builder is TKPP; and further comprising 0.01 to 0.5% by weight of a plant-based oil.

36. The method of claim 35 further comprising a fatty alcohol ethoxylate defoamer.

37. The method of claim 35 further comprising maintaining the pH at greater than 10.

* * * * *